United States Patent [19]

Takahashi et al.

[11] Patent Number: 5,581,363

[45] Date of Patent: Dec. 3, 1996

[54] METHOD AND APPARATUS FOR RECORDING AND REPRODUCING VIDEO SIGNAL

[75] Inventors: Mitsunori Takahashi; Toshiyuki Sado, both of Kanagawa, Japan

[73] Assignee: Sony Corporation, Tokyo, Japan

[21] Appl. No.: 349,997

[22] Filed: Nov. 29, 1994

[30] Foreign Application Priority Data

Nov. 30, 1993 [JP] Japan .................... 5-300689

[51] Int. Cl.⁶ .................................. H04N 5/782
[52] U.S. Cl. ................ 386/109; 360/8; 386/114
[58] Field of Search ...................... 358/335, 312, 358/327, 338, 310; 360/8, 9.1, 33.1, 70, 84, 73.1

[56] References Cited

U.S. PATENT DOCUMENTS

| | | | |
|---|---|---|---|
| 4,510,538 | 4/1985 | Sato et al. | 360/84 |
| 4,609,947 | 9/1986 | Yamagiwa et al. | 358/310 |
| 4,614,980 | 9/1986 | Ninomiya et al. | 358/335 |
| 4,636,873 | 1/1987 | Equchi | 360/8 |

Primary Examiner—Thai Q. Fran
Assistant Examiner—Huy Nguyen
Attorney, Agent, or Firm—William S. Frommer; Alvin Sinderbrand

[57] ABSTRACT

A method and apparatus for recording and reproducing a video signal which enables the provision of a VTR which is reduced in noise, lowered in power consumption, and can be used at a high magnetic permeability, wherein the diameter of the rotary drum and the wrap angle of the magnetic tape on the rotary drum are left unchanged, but the rotational speed of the rotary drum is halved and the number of magnetic heads disposed at the rotary drum are doubled and recording is performed by time expansion by a factor of k of the recording data rate of the video signal. Since the rotational speed of the rotary drum is halved, the noise is reduced and the power consumed by the motor and the rest of the drive system for driving the rotation of the rotary drum is lowered. In addition, the recording data rate is lowered, so use may be made of magnetic heads with high magnetic permeability characteristics.

9 Claims, 9 Drawing Sheets

D1 ~ D6 : RECORDED DIGITAL SIGNALS

Ⓐ, Ⓑ, Ⓒ, Ⓓ : MAGNETIC HEADS RECORDING ON TRACKS

DIRECTION OF DRUM ROTATION

METHOD AND APPARATUS FOR RECORDING AND REPRODUCING VIDEO SIGNAL

BACKGROUND OF THE INVENTION

1. Field of the Invention

The present invention relates to a method and apparatus for recording and reproducing a video signal, more particularly to a method and apparatus which enables a reduction in noise and power consumption.

2. Description of the Related Art

There is a strong demand for reducing the noise in camcorders and other combination video cameras and recorders.

A Japanese Laid-Open Patent Application No. 62-186681 discloses a method enabling long recording by reducing tape running speed of a magnetic tape to 1/n, reducing rotational speed of a rotary drum to 1/n, and recording the video signal by time expansion, that is, intermittently.

According to this method, noise is reduced since the rotational speed of the rotary drum becomes lower. Further, there is an advantage that the reduction of the rotational speed of the rotary drum and the reduction tape running speed of the magnetic tape enable the power consumed by the drive system for driving the same to be reduced.

While the noise was reduced, however, there was the problem of a reduction in the quality of the recorded video signal due to the intermittent recording.

Japanese Laid-Open Patent Application No. 63-160479 discloses a method enabling effective recording of a video signal with a broad frequency band, that is, the improvement of the recording density, by dividing the video signal during the horizontal scanning into 1/N, performing time expansion by a factor of N on the thus divided video signal, and successively recording on the magnetic tape the (N+1) system FM modulated signal through (N+1) number of equidistantly arranged magnetic heads. The rotational speed of the rotary drum is not changed.

There was a problem, however, that the noise could not be reduced since the rotational speed of the rotary drum was left unchanged.

Japanese Laid-Open Patent Aapplication No. 1-49386 discloses a method enabling a rotary drum to be made smaller and the rotational speed not increased that much by arranging k number, at least three, for example, four, magnetic heads at equal intervals of 90 degrees around the rotary drum. This enables parallel recording on m (m being 2 or more or k−1) number of tracks by m number of heads among these, for example, three magnetic heads. When forming a video signal in the horizontal direction by n number of tracks, recording one unit of video signal by time expansion by a factor of [(n+m−1)/n], for example, when n=2 and m=3, by a factor of 2. In this example, there are four magnetic heads and the wrap angle is 270 degrees. When the diameter of the rotary drum is reduced to ⅔, the rotational speed of the rotary drum is increased to 3/2.

Since the rotational speed of the rotary drum is increased to 3/2, there is the problem that the noise becomes that much greater.

Japanese Patent Publication No. 5-50068 discloses provision of four magnetic heads at equal intervals about a rotary drum, that is, at 90 degree intervals, winding the magnetic tape around the rotary drum at a wrap angle of 180 degrees, and recording the video signal by time expansion.

Note that in this technique, the rotational speed of the rotary drum is not changed.

Since the rotational speed of the rotary drum remains unchanged, the noise cannot be lowered. Further, since four recording magnetic heads are disposed at equal intervals, i.e., at 90 degree intervals, when four reproducing magnetic heads are disposed between these recording magnetic heads, there is crosstalk between the recording magnetic heads and reproducing magnetic heads.

SUMMARY OF THE INVENTION

The present invention has an object to provide a method and an apparatus for recording and reproducing a video signal in a combination video camera and recorder, studio equipment, portable equipment, etc.

Further, the present invention has another object to provide a method and an apparatus for recording and reproducing a video signal which enables improvement of the electric-magnetic conversion efficiency.

The following are essential requirements assumed in realization of lower noise of a VTR:

(1) The transmission rate (speed) of the video signal for recording input to the VTR is constant.

(2) The recording format on the magnetic tape (pattern) is a predetermined format in consideration of compatibility with other VTRs.

(3) The speed of the reproduced video signal (transmission rate) is a predetermined value.

The present invention is based on the following idea in addition to the above requirements:

Reduction of the rotational speed of the rotary drum reduces the noise and reduces the power consumption as well. Under a condition that the diameter of the rotary drum and the wrap angle of the magnetic tape on the rotary drum remain unchanged, when the rotational speed of the rotary drum is reduced, the number of magnetic heads is increased by that amount. From the viewpoint of maintaining compatibility, the recording data rate is subjected to time expansion.

This time expansion also improves the electric-magnetic conversion efficiency.

According to one aspect of the present invention, there is provided a method of recording a video signal wherein a magnetic tape is wound at an angle P on a standard rotary drum of a diameter D, and M number of magnetic heads mounted at the standard rotary drum are made to rotate N number of times to record on the magnetic tape the video signal in a recording format substantially identical to a video signal recorded by a standard recording format. The method includes the steps of: defining the diameter $D_R$ of a rotary drum a value substantially the same as the diameter D of the standard rotary drum, providing k×M number (k is an integer of 2 or more) recording magnetic heads on the rotary drum, winding the magnetic tape on the rotary drum by the angle P, rotating the rotary drum at a rotational speed of 1/k the rotational speed of the standard rotary drum, performing time expansion processing by a factor of k on the video signal to be recorded, and recording the time expanded video signal on the magnetic tape through the recording magnetic heads.

Further, according to another aspect of the invention, there is provided a method of reproducing a video signal wherein a magnetic tape is wound at an angle P on a standard rotary drum of a diameter D, and M number of magnetic heads mounted at the standard rotary drum rotate N number of times to obtain on the magnetic tape the video signal in a recording format substantially identical to a video signal recorded by a standard recording format, including the steps of: defining the diameter $D_R$ of the rotary drum a value substantially the same as the diameter D of the standard rotary drum, providing k×M number (k is an integer of 2 or more) recording magnetic heads on the rotary drum, providing k×M number of reproducing magnetic heads on the rotary drum, winding the magnetic tape on the rotary drum by the angle P, rotating the rotary drum at a rotational speed of 1/k the rotational speed of the standard rotary drum, performing time expansion processing by a factor of k on the video signal to be recorded, recording the time expanded video signal on the magnetic tape through the recording magnetic heads, a step of reading the video signal recorded on the magnetic tape through the reproducing magnetic heads, performing time compression by a factor of 1/k on the read video signal.

According to still another aspect of the invention, there is provided an apparatus for recording a video signal wherein a magnetic tape is wound at an angle P on a standard rotary drum of a diameter D and M number of magnetic heads mounted at the standard rotary drum are made to rotate N number of times to record on the magnetic tape the video signal in a recording format substantially identical to a video signal recorded by a standard recording format, which is comprised of a rotary drum having a diameter $D_R$ of a value substantially the same as the diameter D of the standard rotary drum, k×M number (k is an integer of 2 or more) recording magnetic heads provided on the rotary drum, means for winding the magnetic tape on the rotary drum by the angle P, means for rotating the rotary drum at a rotational speed of 1/k the rotational speed of the standard rotary drum, means for performing time expansion processing by a factor of k on the video signal to be recorded, and means for recording the time expanded video signal on the magnetic tape through the recording magnetic heads.

Preferably, the diameter of the rotary drum is corrected by a value so that the speed of the magnetic tape does not substantially affect the peripheral speed of the rotary drum.

Preferably, further, a lead angle of the rotary drum is corrected in accordance with the air film.

Preferably, still further, the recording magnetic heads are disposed together in two groups of half the magnetic heads each facing each other across a line passing through the center of the drum and the plurality of recording magnetic heads disposed adjoining each other on each side of the rotary drum are disposed separated by exactly a predetermined angle.

According to still another aspect of the invention, there is provided an apparatus for reproducing a video signal in which a magnetic tape is wound at an angle P on a standard rotary drum of a diameter D and M number of magnetic heads mounted at the standard rotary drum rotate N number of times to obtain on the magnetic tape the video signal in a recording format substantially identical to a video signal recorded by a standard recording format. The apparatus comprises of a rotary drum having a diameter $D_R$ of a value substantially the same as the diameter D of the standard rotary drum, k×M number (k is an integer of 2 or more) recording magnetic heads provided at the rotary drum, k×M number of reproducing magnetic heads provided on the rotary drum, means for winding the magnetic tape on the rotary drum by the angle P, means for rotating the rotary drum at a rotational speed of 1/k the rotational speed of the standard rotary drum, means for performing time expansion processing by a factor of k on the video signal to be recorded, means for recording the time expanded video signal on the magnetic tape through the recording magnetic heads, means for reading the video signal recorded on the magnetic tape through the reproducing magnetic heads, and means for performing time compression by a factor of 1/k on the read video signal.

Preferably, the reproducing magnetic heads are disposed in two groups facing each other across the center of the rotary drum at positions substantially orthogonal to the recording magnetic heads and the plurality of reproducing magnetic heads disposed adjoining each other on each side of the rotary drum are disposed separated by exactly a predetermined angle.

According to still another aspect of the invention, there is provided an apparatus for reproducing a video signal. The apparatus comprises a magnetic tape obtained by winding the magnetic tape at an angle P on a standard rotary drum of a diameter D and rotating M number of magnetic heads mounted at the standard rotary drum N number of times to record on the magnetic tape the video signal in a recording format substantially identical to a video signal recorded by a standard recording format by the means of providing, at a rotary drum having a diameter $D_R$ of a value substantially the same as the diameter D of the standard rotary drum, k×M number (k is an integer of 2 or more) recording magnetic heads, winding the magnetic tape on the rotary drum by an angle P, rotating the rotary drum at a rotational speed of 1/k the rotational speed of the standard rotary drum, performing time expansion processing by a factor of k on the video signal to be recorded, and recording the time expanded video signal on the magnetic tape through the recording magnetic heads. The apparatus further comprises k×M number of reproducing magnetic heads provided at the rotary drum, means for reading the video signal recorded on the magnetic tape through the reproducing magnetic heads, and means for performing time compression by a factor of 1/k on the read video signal.

In the recording operation, since the wind (wrap) angle of the magnetic tape and the diameter of the rotary drum are left substantially unchanged, but the number of the recording magnetic heads disposed at the rotary drum is increased by a factor of k (k being an integer of at least 2), the video signal is recorded on the magnetic tape by making the rotary drum at 1/k the speed and subjecting the video signal to be recorded to time expansion by a factor of k, that is, changing the recording data rate.

Reduction of the rotational speed of the rotary drum reduces the noise and reduces the power consumption as well. The time expansion of the recording data rate also improves the electric-magnetic conversion efficiency.

In the reproduction operation, the signal is read by the same number of reproducing magnetic heads as the recording magnetic heads disposed at the rotary drum spinning at a rotational speed of 1/k. The read video signal is subjected to time compression by a factor of 1/k, that is, the reproduction data rate is converted, to reproduce the video signal.

These and other objects, advantages and features of the invention will become apparent to those skilled in the art upon consideration of the following description of the invention.

BRIEF DESCRIPTION OF THE DRAWINGS

The above and other objects and features of the present invention will be more apparent from the following description of the preferred embodiments with reference to the accompanying drawings, wherein:

FIG. 3 is a view of the recording format of a video signal recorded on a magnetic tape by the processing shown in FIGS. 2A to 2G, FIGS. 4A to 4F are graphs of the reproduction of the above recorded video signal, wherein

DESCRIPTION OF THE PREFERRED EMBODIMENTS

First, an explanation will be made of the basic configuration of a first embodiment of an apparatus for recording and reproducing a video signal according to the present invention.

Figure 1:
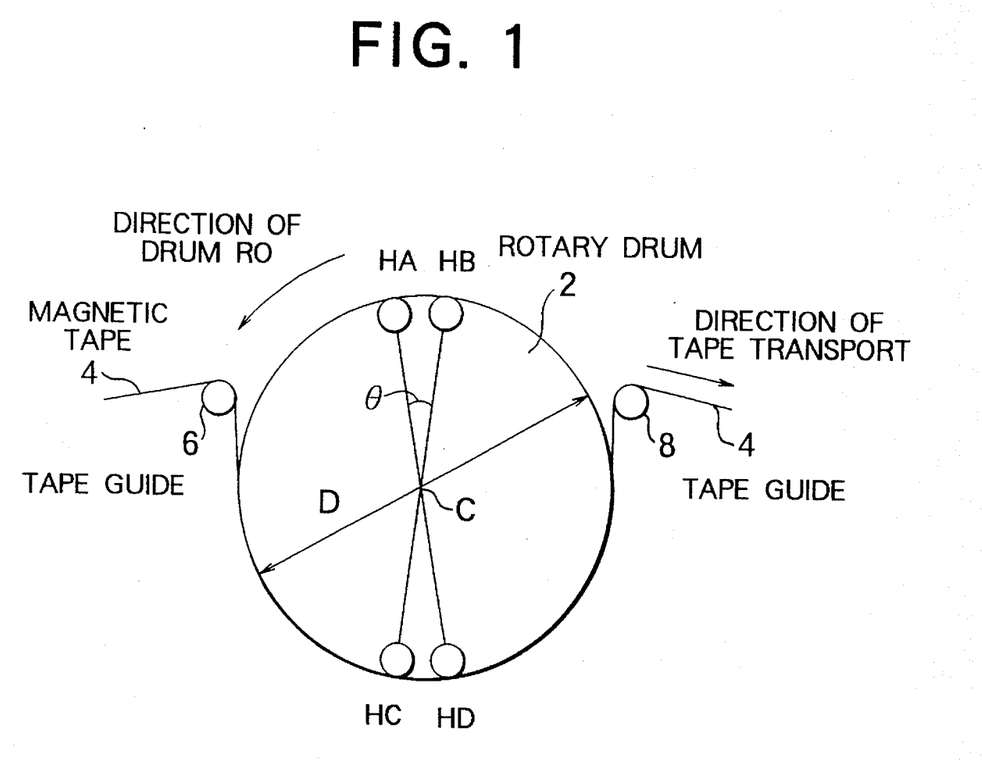
FIG. 1 is a view of the basic configuration of a combination video camera and recorder according to a first embodiment of the present invention for reducing the rotational speed of the rotary drum.

FIG. 1 is a view of the basic configuration of a combination video camera and recorder according to an embodiment of the present invention reducing the rotational speed of the rotary drum.

At the rotary drum 2 there are provided two pairs of magnetic heads. The magnetic heads HA and HB are disposed at the rotary drum 2 adjoining each other separated by exactly a predetermined angle θ. The other magnetic heads HC and HD are also disposed at the rotary drum 2 adjoining each other separated by exactly a predetermined angle θ. The two pairs of magnetic heads are disposed at symmetrical positions across a center C of the rotary drum 2.

The magnetic tape is inserted between the tape guides 6 and 8 and the rotary drum 2 and is wound (wrapped) around the rotary drum 2 at an angle of 180°.

In this example, the diameter D of the rotary drum 2 is the same diameter D as a rotary drum of a standard VTR. The diameter D of the rotary drum 2 therefore is left unchanged.

The wrap (wind) angle of the magnetic tape 4 on the rotary drum 2 is also 180° and is the same as the wrap angle in a standard VTR of a studio or a combination video camera and recorder.

Note that the wrap angle of the magnetic tape 4 of 180° is only an illustration and that the wrap angle of the magnetic tape 4 may be 270° or another wrap angle as well. In summary, there is no need to change the wrap angle of the magnetic tape 4 and the diameter of the rotary drum 2.

Figures 2A, 2B:
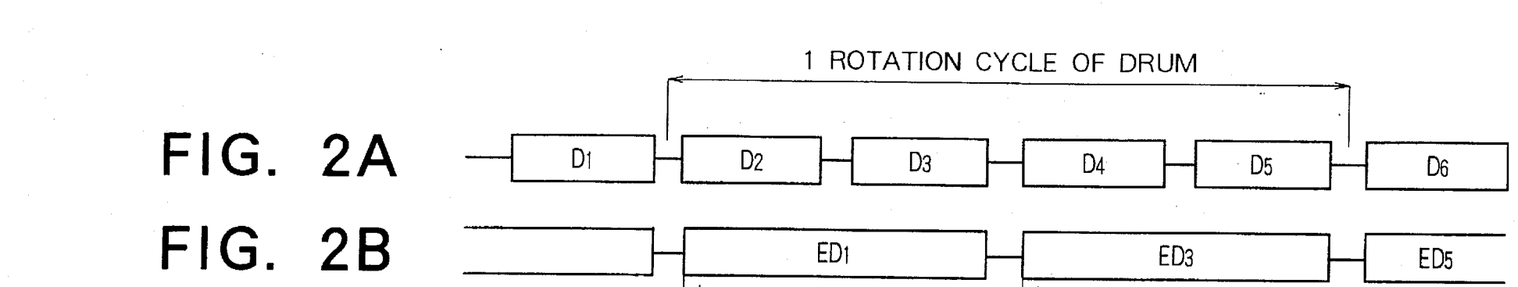
FIG. 2A is a graph showing a recording video signal input to an apparatus for recording and reproducing a video signal.
FIGS. 2B and 2C are graphs showing the time expansion of a unit block video signal.

FIG. 2A shows a recording video signal input to an apparatus for recording and reproducing a video signal. The video signal is successively and continuously input as the unit block video signals $D_1$, $D_2$, $D_3$, $D_4$, $D_5$, and $D_6$. Four video signal blocks, for example, $D_2$, $D_3$, $D_4$, and $D_5$ are recorded on the magnetic tape 4 in one turn of the rotary drum 2.

Figure 3:
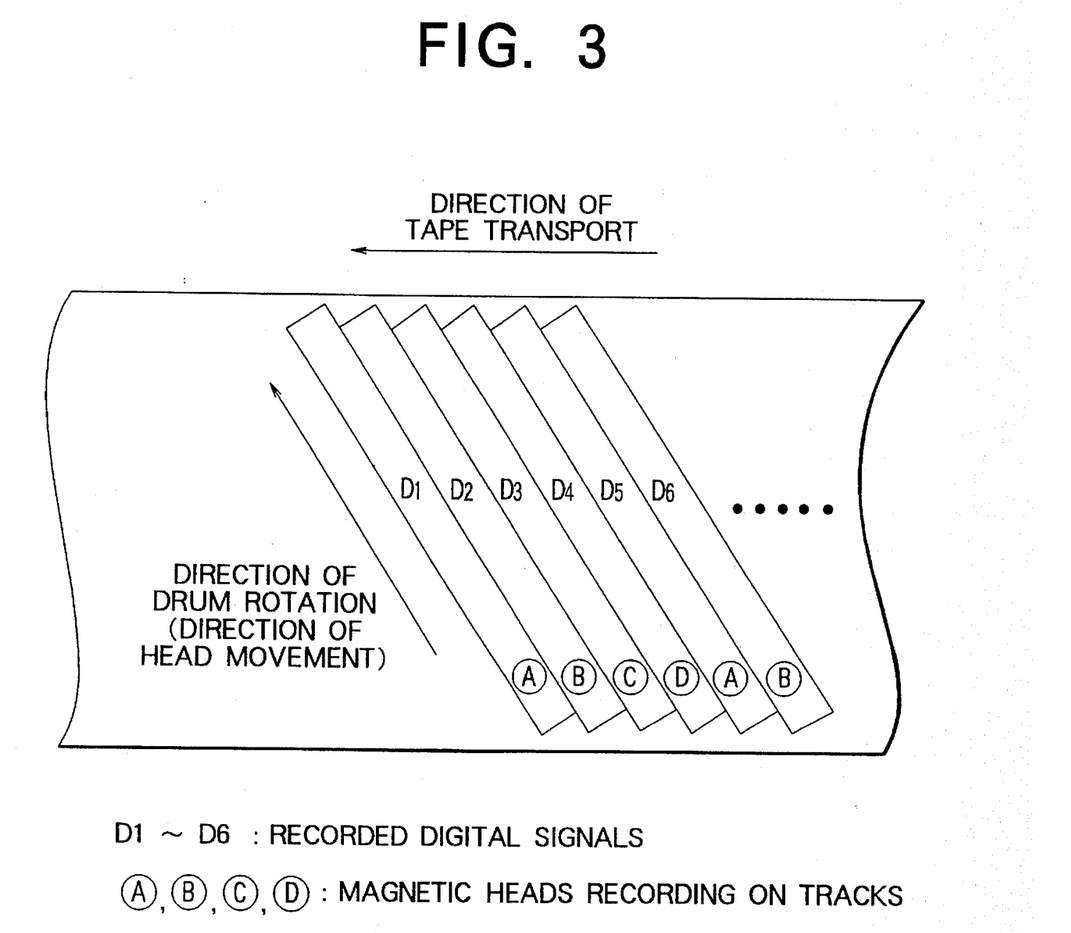

These unit block video signals are, as shown in FIG. 3, recorded on the tracks of the magnetic tape 4 along the direction of rotation of the rotary drum in the inclined scanning direction of the magnetic heads.

Figure 2C:
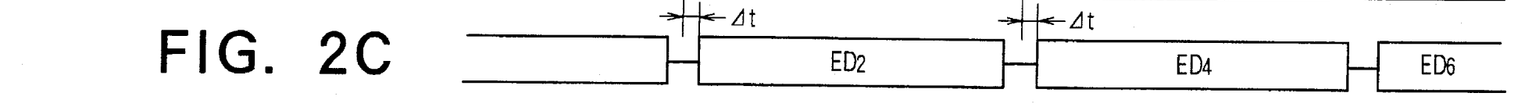
Figures 2D, 2E:
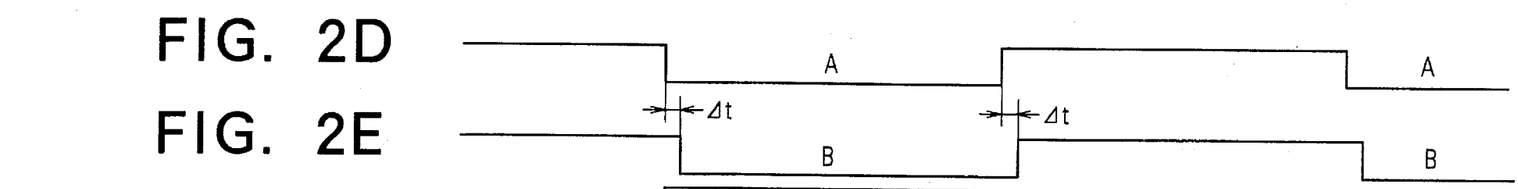
FIGS. 2D to 2G are graphs showing the timing of a recording enable signal to the magnetic heads.
Figures 2F, 2G:
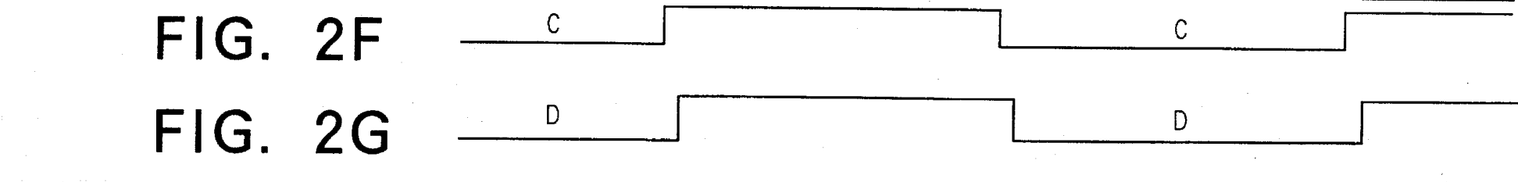

When recording the video signal in unit blocks on the magnetic tape 4, as illustrated in FIGS. 2B and 2C, the unit block video signal is subjected to time expansion. In this example, the input video signal is subjected to time expansion by a factor of 2.

The video signal one unit before and the next video signal, for example, the unit block video signals $D_1$ and $D_2$ recorded by the adjoining magnetic heads Ha and HB and the unit block video signals $D_3$ and $D_4$ recorded by the adjoining magnetic heads HC and HD, are subjected to time expansion at substantially the same timings, but, as illustrated in FIG. 1, there is a distance of an angle θ between adjoining magnetic heads, so the expansion processing of the magnetic heads HB and HD with appear later in the rotation results in time expansion delayed by a time $\Delta_t$ corresponding to that delay time compared with the time expansion processing at the preceding magnetic heads HA and HC.

FIGS. 2D to 2G show the timings of a recording enable signal to the magnetic heads HA and HB and the magnetic heads HC and HD. When the recording enable signal is a "low enable" signal, that is, an enable signal of a low level, the video signal time expanded through the magnetic heads is recorded on the magnetic tape 4.

FIG. 3 shows the recording format of a video signal recorded on the magnetic tape 4 by the above processing. This recording format is no different from the recording format of a standard VTR of a studio etc, or a combination video camera and recorder. According, the compatibility is maintained.

As illustrated in FIG. 3, the unit block video signal $D_1$ is recorded on a track of the magnetic tape 4 by the magnetic head HA and the unit block video signal $D_2$ is recorded on the track adjoining the recording track by the magnetic head HB. Similarly, the unit block video signal $D_3$ is recorded on a track of the magnetic tape 4 by the magnetic head Hc and the unit block video signal $D_4$ is recorded on the track adjoining the recording track by the magnetic head HD.

The standard VTR as used in a studio or combination video camera and recorder and the combination video camera and recorder of the first embodiment explained above will now be compared referring to Table 1.

TABLE 1

|  | Standard VTR | VTR of invention |
| --- | --- | --- |
| Tape-wrap angle | 180° | Same |
|  | 270° or other angles | 270° or other angles |
| Drum diameter | D | Same |
| Drum rotational speed | N (Hz) | ½ · N (Hz) |
| No. of magnetic heads | M = 2 | 2M = 4 |
| Recording data rate | R | ½ · R |
| Recording format |  | Same |

In this embodiment, the rotational speed of the rotary drum 2 becomes half that of the standard VTR of a studio or a combination video camera and recorder. According, the relative speed between the magnetic tape 4 and the magnetic heads HA, HB, HC, and HD is reduced to half, so the beating sound is reduced falls and the noise is reduced compared with a standard VTR.

Further, if the rotational speed of the rotary drum 2 is halved, the sound of the motor and bearings driving the rotary drum 2 becomes smaller and therefore the noise is further lessened.

Still further, the driving force (power) of the motor and the rest of the drive system for spinning the rotary drum 2 is reduced.

In addition, since the relative speed between the magnetic tape 4 and magnetic heads falls, the clearance of air, or "air film", between the rotary drum 2 during rotation and the transported magnetic tape 4 becomes smaller. As a result, the spacing loss at the time of recording and reproducing by a short wavelength becomes smaller. Therefore, high density recording becomes possible.

Since the recording data rate is reduced to half, use of magnetic heads in a frequency domain with a high magnetic permeability becomes possible, so recording and reproducing with a good electric-magnetic conversion efficiency become possible. As a result, the power consumption can be further reduced.

FIG. 4 is a graph of the reproduction of the recorded video signal explained above.

Figure 4A:
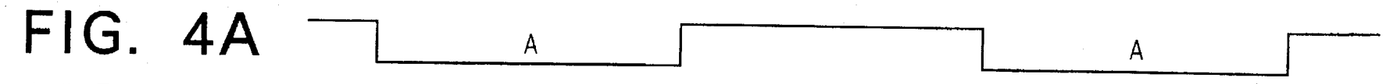
FIGS. 4A to 4D show the reproduction enable signal.
Figure 4B:
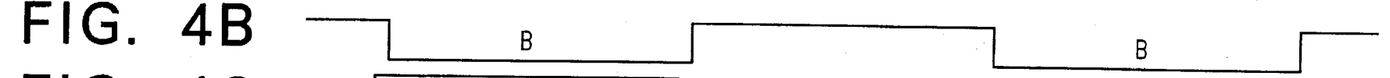
Figure 4C:
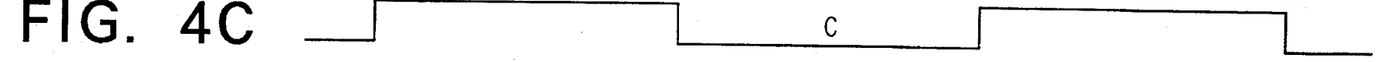
Figure 4D:
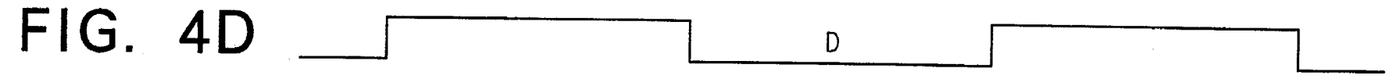
Figure 4E:
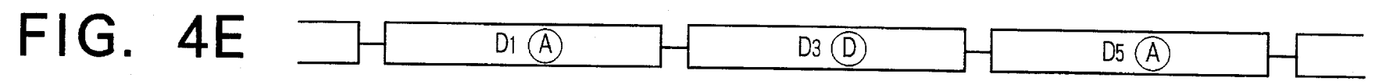
FIGS. 4E to 4F show the read video signal.
Figure 4F:
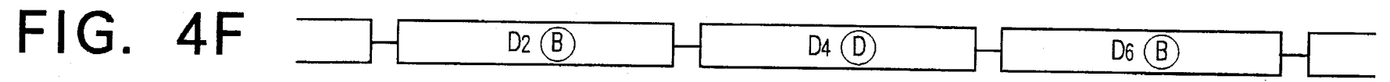
Figure 4G:
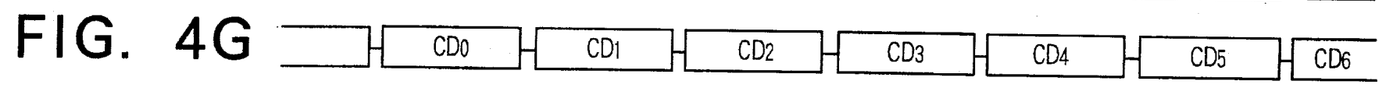
FIG. 4G shows the original time-compressed video signal.

At the time of reproduction, the "low enable" reproduction enable signal shown in FIGS. 4A to 4D is gated to the signal read from the magnetic heads (not shown). As illustrated in FIGS. 4E to 4F, a time expanded video signal recorded on the magnetic tape 4 is obtained. Next, as illustrated in FIG. 4G, the signal is compressed in half on the time axis to reproduce the original video signal.

At the time of reproduction as well, the rotary drum 2 spins at half the usual rotational speed, so the beating sound is reduced and the power consumption of the rotary drum 2 and its drive system is lowered.

Here, an explanation will be made of a combination video camera and recorder according to a second embodiment of an apparatus for recording and reproducing a video signal of the present invention. The second embodiment shows a preferred embodiment of the invention which is more practical than the combination video camera and recorder of the first embodiment.

Figure 5:
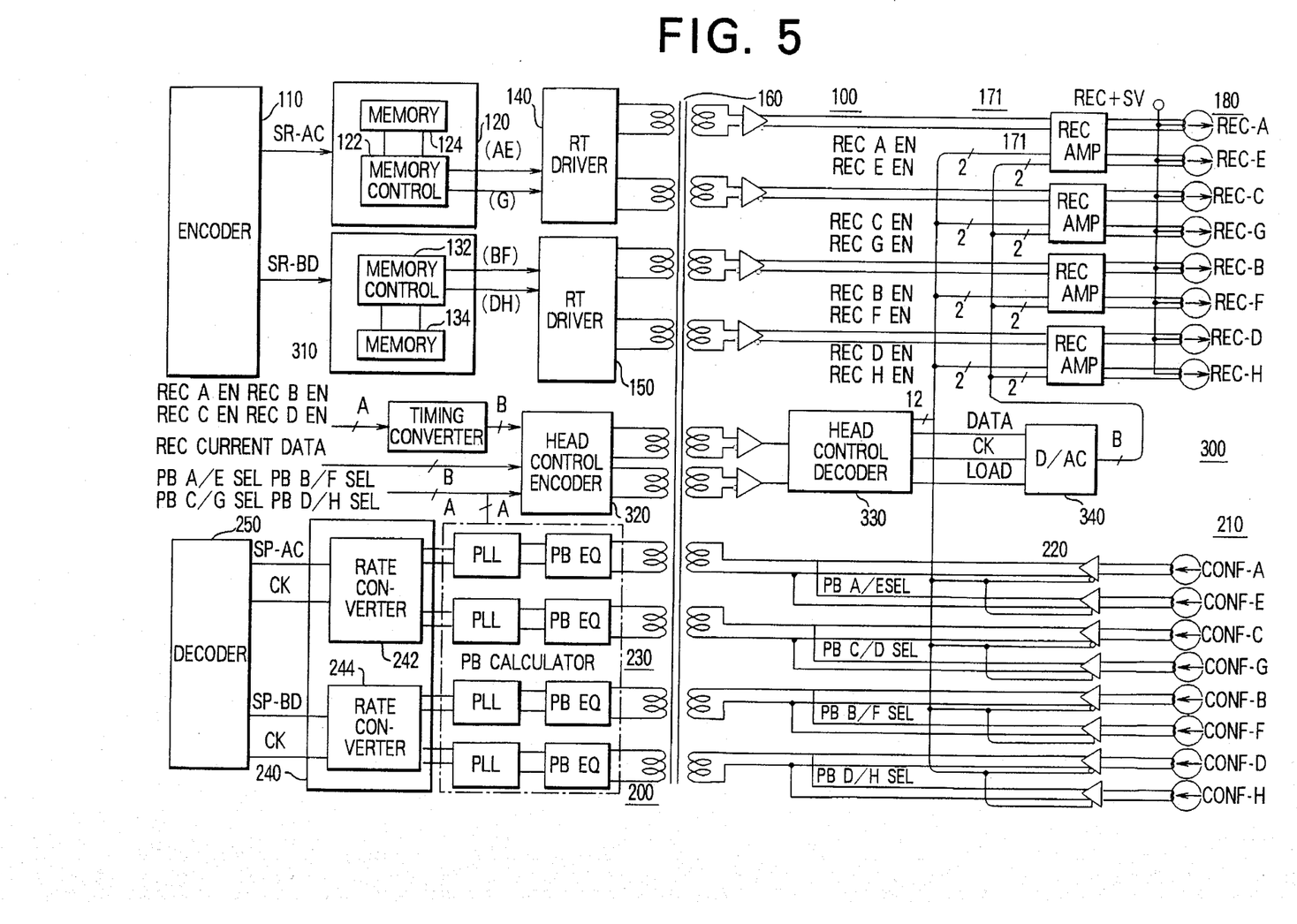
FIG. 5 is a view of the overall configuration of a combination video camera and recorder according to a second embodiment of an apparatus for recording and reproducing a video signal of the present invention.

FIG. 5 is a view of the overall configuration of a combination video camera and recorder according to the second embodiment of an apparatus for recording and reproducing a video signal of the present invention.

This combination video camera and recorder is provided with a recording system 100, reproduction system 200, and common processing system 300.

In this example, there are eight recording magnetic heads REC-A to REC-H and eight reading (reproducing) magnetic heads CONF-A to CONF-H. In the first embodiment, the explanation was made without differentiating between the recording magnetic heads and reproducing magnetic heads, but this example shows a configuration with provision of separate recording magnetic heads and reproducing magnetic heads in accordance with an actual combination video camera and recorder.

Figure 6:
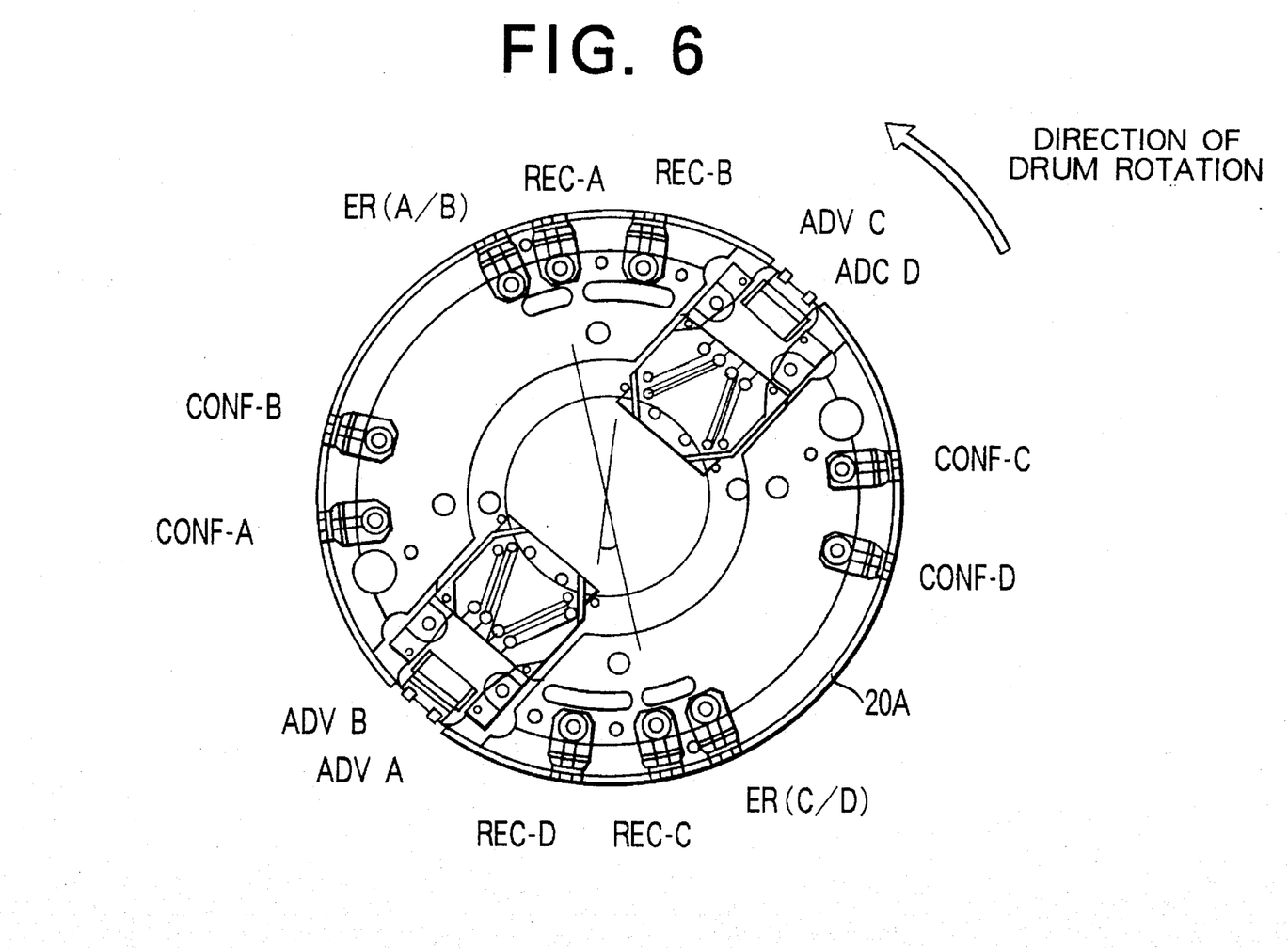
FIG. 6 is a plane view of the state of disposition of a standard recording magnetic heads and reproducing magnetic heads at a rotary drum as used in studio equipment.

FIG. 6 is a plane view of the state of disposition of four recording magnetic heads REC-A to REC-D and four reproducing magnetic heads CONF-A to CONF-D at a rotary drum 20A of a standard type used in studio equipment.

Figure 7:
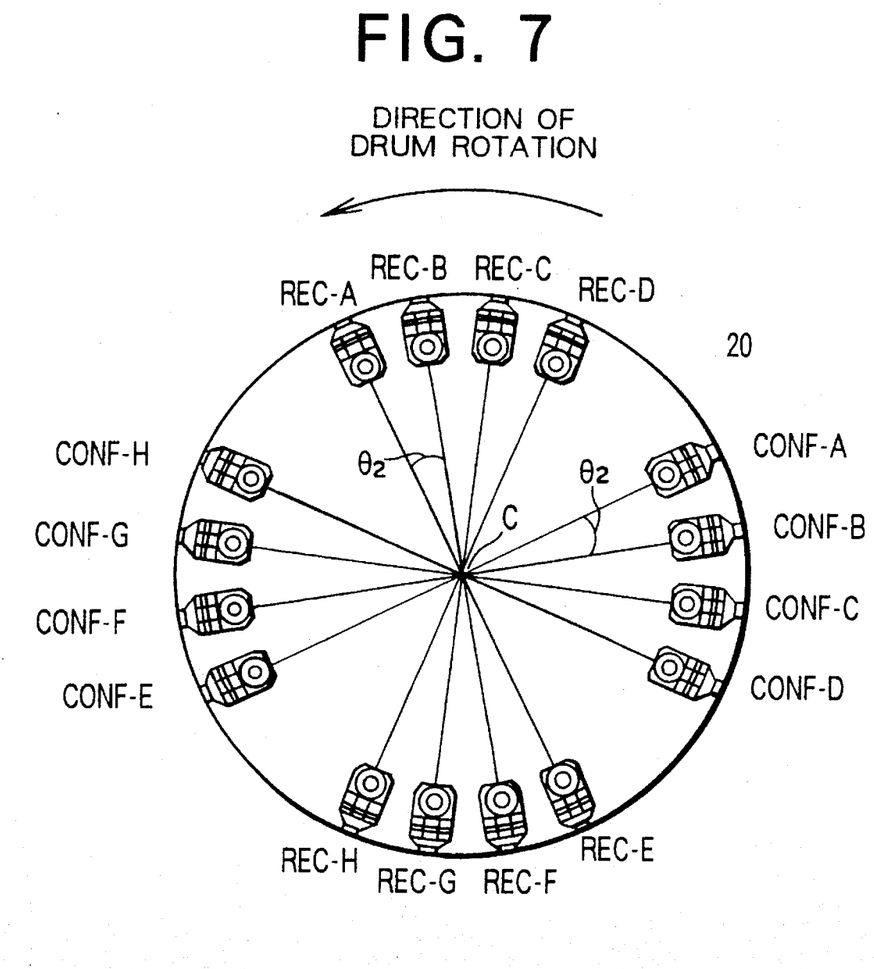
FIG. 7 is a plane view of a rotary drum for a ½ rotational speed, which halves the rotational speed of the rotary drum, and the state of disposition of recording magnetic heads and reproducing magnetic heads at the same as used in a combination video camera and recorder of the present embodiment.

FIG. 7 is a plane view of a rotary drum 20 for a ½ rotational speed, which halves the rotational speed of the rotary drum, used in a combination video camera and recorder (camcorder) of the present embodiment, and the state of disposition of the above-mentioned eight recording magnetic heads REC-A to REC-H and eight reading (reproducing) magnetic heads CONF-A to CONF-H disposed at the same.

Figure 8:
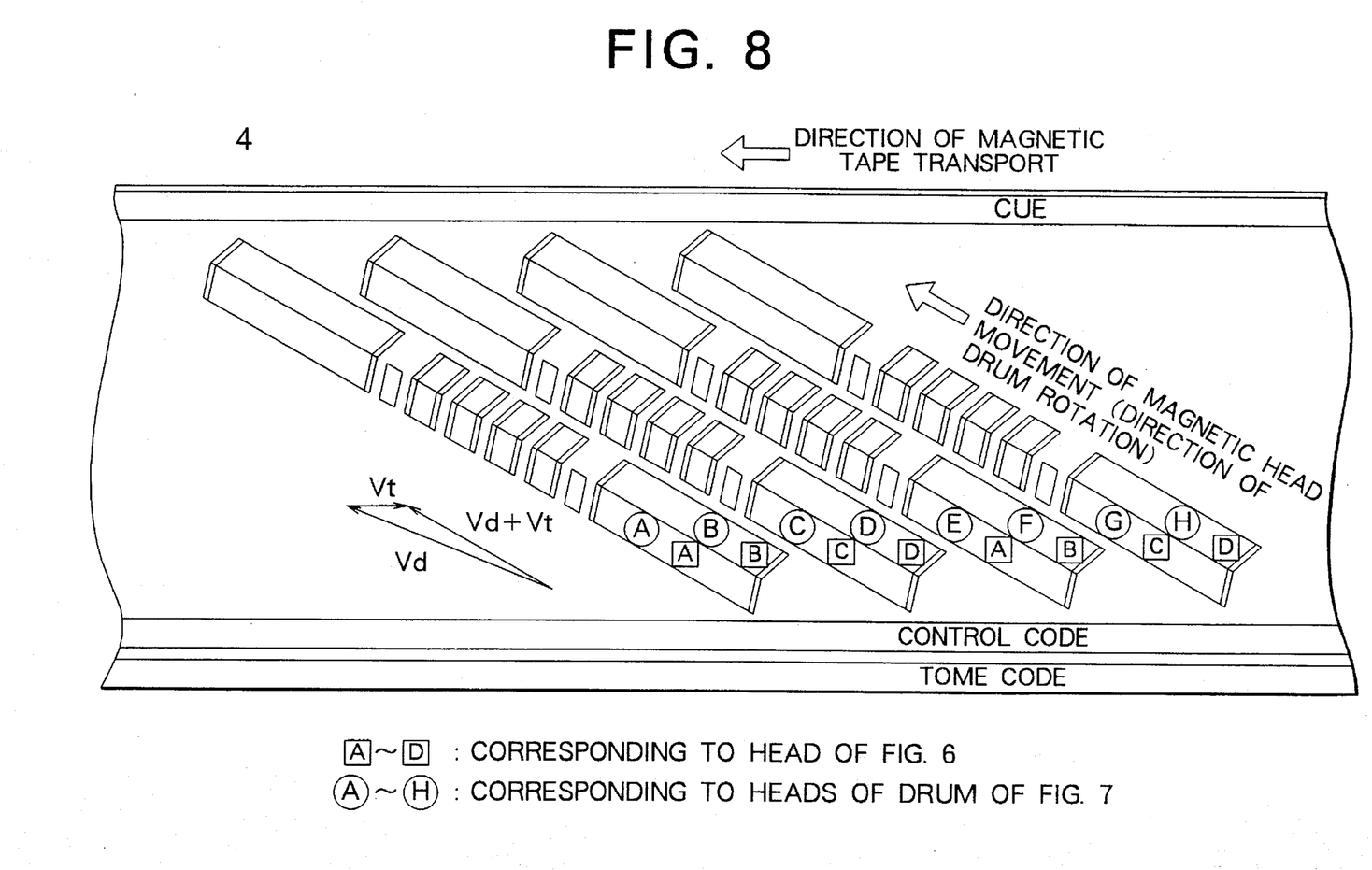
FIG. 8 is an illustration of the recording format and which track a video signal is recorded on by which magnetic head at the time of recording a video signal on a magnetic tape using the rotary drum shown in FIG. 6 and the rotary drum shown in FIG. 7.
Figure 9A:
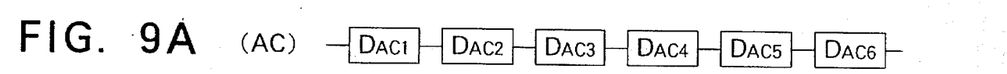
FIG. 9 is a view of the timing of the recording processing in a combination video camera and recorder shown in FIG. 5.
Figure 9B:
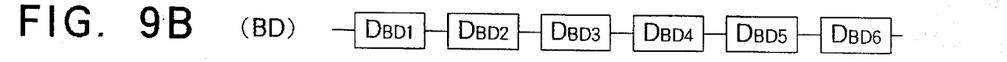
Figure 9C:
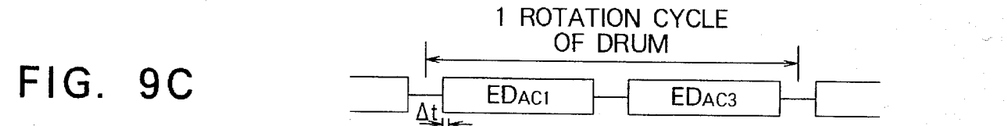
Figure 9D:
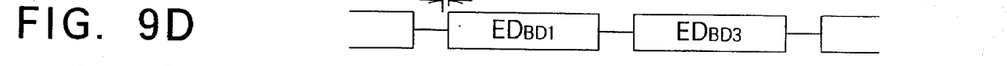
Figure 9E:
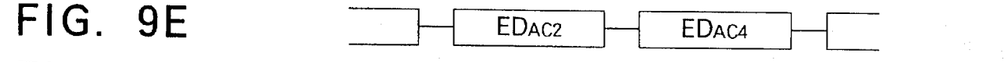
Figure 9F:
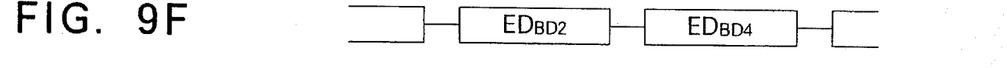
Figure 9G:
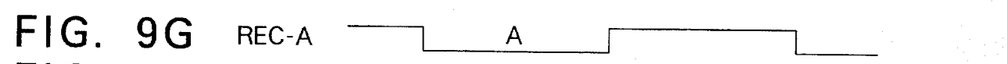
Figure 9H:
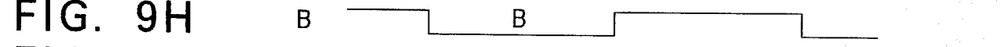
Figure 9I:
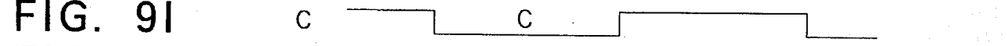
Figure 9J:
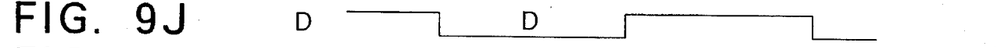
Figure 9K:
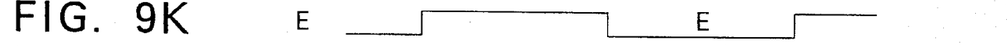
Figure 9L:
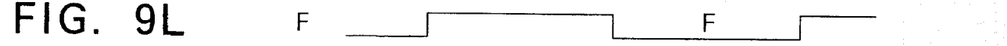
Figure 9M:
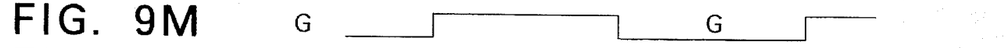
Figure 9N:
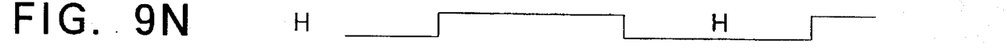

FIG. 8 is an illustration of the recording format at the time of recording a video signal on a magnetic tape 4 using the rotary drum 20A shown in FIG. 6 and the rotary drum 20 shown in FIG. 7 and which track a video signal is recorded on by which magnetic head.

In FIG. 3, the recording format was illustrated in brief, but the actual recording format, as shown in FIG. 8, is an azimuth recording format. That is, as shown by the hatching at the two sides of the rotational axis of the rotary drum, adjoining tracks are kept free from the effects of crosstalk by having one track recorded with a + (plus) azimuth and the other track recorded with a − (minus) azimuth.

In FIG. 6, the two recording magnetic heads REC-A and REC-B are disposed at one side of the rotary drum 20A and the two recording magnetic heads REC-C and REC-D are disposed at the other side. The two recording magnetic heads REC-A and REC-B are disposed at angles of exactly $\theta_1$. Similarly, the two recording magnetic heads REC-C and REC-D are disposed at angles of exactly $\theta_1$.

The two reproducing magnetic heads CONF-A and CONF-B and the two reproducing magnetic heads CONF-C and CONF-D are disposed along the periphery of the rotary drum 20 between the group of the two recording magnetic heads REC-A and REC-B and the group of the two recording magnetic heads REC-C and REC-D.

Also disposed at the rotary drum 20A are the erase heads ER (A/B) and ER (C/D) and special reproducing heads ADV-A to ADV-D.

In FIG. 7, the four recording magnetic heads REC-A to REC-D are disposed at one side of the rotary drum 20 and the four recording magnetic heads REC-E to REC-H are disposed at the other side across the center C of the rotary drum 20. The four recording magnetic heads REC-A to REC-D are disposed at angles of exactly $\theta_2$. Similarly, the four recording magnetic heads REC-E to REC-H are disposed at angles of exactly $\theta_2$.

The four reproducing magnetic heads CONF-A to CONF-D and the four reproducing magnetic heads CONF-E to CONF-H are disposed along the periphery of the rotary drum 20 and the four recording magnetic heads REC-A to REC-D and the four recording magnetic heads REC-E to REC-H are disposed between these magnetic head groups. There is a 90° interval between these magnetic head groups. If there is a difference of angle of 90° in this way, that is, an interval of distance at the periphery of the rotary drum 20, there is less effect of crosstalk.

The differences between the rotary drum 20 and magnetic heads in the second embodiment shown in FIG. 6 and the magnetic heads disposed at the rotary drum 20A shown in FIG. 7 and other related parameters are compared in Table 2.

TABLE 2

|  | FIG. 7 | FIG. 6 |
| --- | --- | --- |
| Diameter of rotary drum | D | No change |
| No. of recording use magnetic heads | 4 | 8 (double) |
| No. of reproduction use magnetic heads | 4 | 8 (double) |
| Lead angle |  | No change |
| Drum rotational speed | N | ½ · N |
| Wrap angle | 180° | No change |

As shown in FIG. 8, when the rotary drum 20A shown in FIG. 6 is used, two magnetic heads REC-A and REC-B are used to record two tracks' worth of a video signal on the magnetic tape 4 in a half rotation of the rotary drum 20A and two magnetic heads REC-C and REC-D are used to record another two tracks' worth of a video signal on the magnetic tape 4 in the remaining half rotation.

On the other hand, when using the rotary drum 20 shown in FIG. 7, the recording data rate is halved, so the magnetic heads REC-A, REC-B, REC-C, and REC-D are used to record four tracks' worth of the video signal on the magnetic tape 4 in a half rotation of the rotary drum 20 and the magnetic heads REC-E, REC-F, REC-G, and REC-H are used to record four tracks' worth of the video signal on the magnetic tape 4 in the remaining half rotation.

That is, to record eight tracks' worth of a video signal on the magnetic tape 4, the rotary drum 20A shown in FIG. 6 rotates two times while the rotary drum 20 shown in FIG. 7 rotates one time. The ratio of rotational speed is 2:1, so therefore eight tracks' worth of the video signal can be recorded on the magnetic tape 4 in the same time. Accordingly, compatibility is maintained.

The recording system 100 in the combination video camera and recorder shown in FIG. 5 has an error correction encoder 110, a first rate converter 120, a second rate converter 130, a first rotary transformer drive circuit 140, a second rotary transformer drive circuit 150, a rotary transformer 160, a recording amplifier 170, and a recording head unit 180.

Details of the recording head unit 180 were already given with reference to FIG. 7.

The error correction encoder 110 adds the error correction code to the video signal to be recorded and encodes and outputs the two systems of recording data SR-AC and SR-BD.

The first rate converter 120 has a memory control circuit 122 and memory 124 and performs time expansion by a factor of 2 on the recorded data SR-AC from the error correction encoder 110. The time expansion is realized by storing the recorded data SR-AC from the first rate converter 120 in the memory 124 and reading out from the memory 124 the recorded data SR-AC at a speed half of the speed of storage. The memory control circuit 122 controls the storage and reading. The memory control circuit 122 outputs to the first rotary transformer drive circuit 140 the recording signal for the recording magnetic heads REC-A and REC-E and heads REC-C and REC-G disposed facing each other as shown in FIG. 6.

The second rate converter 130 has a memory control circuit 132 and memory 134 and, like the first rate converter 120, performs time expansion by a factor of 2 on the recorded data SR-BD from the error correction encoder 110. The memory control circuit 122 outputs to the second rotary transformer drive circuit 150 the recording signal for the recording magnetic heads REC-B and REC-F and heads REC-D and REC-H disposed facing each other as shown in FIG. 6.

The first rotary transformer drive circuit 140 and second rotary transformer drive circuit 150 amplify and output to the rotary transformer 160 the recording signal from the first rate converter 120 and second rate converter 130.

The rotary transformer 160 transmits the recording signal applied to the primary side coil to the secondary side coil in a non-contact manner.

The recording signal from the rotary transformer 160 is applied to the recording amplifier 170 and is recorded on the magnetic tape 4 through the recording magnetic head unit 180.

The timing of recording on the magnetic tape 4 is such as to enable recording of the recording video signal substantially in parallel using the magnetic heads REC-A, REC-B, REC-C, and REC-D, which are arranged in close proximity at angles of $\theta_2$. Next, the magnetic heads REC-E, REC-F, REC-G, and REC-H disposed at positions facing the above magnetic heads are used to enable recording of a recording video signal substantially in parallel.

The signal processing at the error correction decoder 110, the first rate converter 120, the second rate converter 130, the first rotary transformer drive circuit 140, the second rotary transformer drive circuit 150, and the recording amplifier 170 is dispersed in consideration of the above recording timing.

The common processing system 300 applies the enable signal to the recording amplifier 170 and enables the unit block video signal which has been subjected to time expansion by a factor of 2 at the first rate converter 120 and second rate converter 130 to be recorded at the predetermined position on the magnetic tape 4.

Therefore, the common processing system 300 has a timing conversion circuit 310, a magnetic head control signal encoder 320, a magnetic head control signal decoder 330, and a D/A converter 340.

The enable signal based on the recording timing of the magnetic head REC-A or REC-E is applied from the magnetic head control signal decoder 330 to the amplifier 171 above the recording amplifier 170 connected to the magnetic heads REC-A and REC-E. The same is true for the other amplifiers as well.

The recording current data is applied from the D/A converter 340 to the recording amplifier 170.

FIG. 9 is a timing chart of the time expansion processing of the video signal at the first rate converter 120 and second rate converter 130 mentioned above and the enable signal output from the magnetic head control signal decoder 330.

The reproduction system 200 shown in FIG. 5 has a reproducing head unit 210, amplifier 220, reproduction equalizer 230, rate converter 240, and error correction decoder 250. The detailed configuration of the reproducing head unit 210 is shown in FIG. 7.

The operation of the reproduction system is reverse to the operation of the recording system 100 explained above. That is, the time-expanded video signal recorded on the magnetic tape 4 is read by the reproducing head unit 210, more specifically the reproducing magnetic heads CONF-A to CONF-H shown in FIG. 7 and is amplified by the amplifier

220. The output of the amplifier 220 is applied to the reproduction equalizer 230 through the rotary transformer 160, but the amplified signal is output from the amplifier 220 at the timing of the selection signal from the magnetic head control signal decoder 330.

The reproduction equalizer 230 equalizes the signal from the rotary transformer 160 by a previous reproduction equalization circuit and outputs a clock and reproduced video signal phase locked by a later phase locked loop circuit (PLL) to the rate converter 240.

The rate converter 240 has a first rate converter 242 and second rate converter 244. The first rate converter 242, like the first rate converter 120, has a memory and a memory control circuit and performs an operation reverse to the time expansion at the first rate converter 120, that is, time-compression processing. The second rate converter 244, like with the second rate converter 130, has a memory and a memory control circuit and performs an operation reverse to the time-expansion at the second rate converter 130, that is, time-compression processing.

A reproduced video signal compressed by the first rate converter 242 and the second rate converter 244 and substantially the same in state as before the signal is applied to the first rate converter 120 and second rate converter 130 is subjected to error correction decoding at the error correction decoder 250.

Note that in the embodiment explained with reference to FIG. 5, illustration was made of the case of performing time-expansion in the first rate converter 120 and second rate converter 130 and performing time-compression in the first rate converter 242 and second rate converter 244, but a combination video camera and recorder, of course, and ordinary VTRs shuffle the video signal at the time of recording and deshuffle the video signal at the time of reproduction. Memories are used for this shuffling and deshuffling. Accordingly, the above-mentioned rate conversion processing can be performed without providing the first rate converter 120 and second rate converter 130 and the first rate converter 242 and second rate converter 244 by performing time-expansion on the timing of writing and reading the video signal in and from the memories like with the first rate converter 120 and second rate converter 130 and time-compression like with the first rate converter 242 and second rate converter 244.

An explanation will next be given of a third embodiment of the present invention.

In the second embodiment, as illustrated in FIG. 8, it was assumed that the speed $V_t$ of the magnetic tape 4 was extremely low compared with respect to the peripheral speed $V_d$ of the rotary drum 20 and that the tape speed $V_t$ could be ignored compared with the peripheral speed $V_d$. In actuality, however, the recording pattern recorded on the magnetic tape 4 depends on the relative speed of the magnetic head and the magnetic tape 4, that is, the combined speed of the peripheral speed $V_d$ of the rotary drum 20 and the speed $V_t$ of the magnetic tape 4 (speed of resultant vector), so to record a video signal by an accurate recording format without being affected by the speed $V_t$ of the magnetic tape 4, it is desirable to very slightly correct the diameter of the rotary drum 20. In particular, in the present invention, since the rotational speed of the rotary drum 20 is halved, the effect of the speed $V_t$ of the magnetic tape 4 on the peripheral speed $V_d$ of the rotary drum 20 becomes greater.

Accordingly, in the third embodiment, the diameter of the rotary drum 20, more preferably the still angle (or lead angle) is slightly corrected. This correction differs depending on the direction of the recording format etc. as well.

Giving specific figures, the diameter of the rotary drum 20 was corrected about 0.5 percent from the diameter of the standard drum.

Note that the correction of the lead angle is based on the thickness of the air film between the magnetic tape 4 and the rotary drum 20 etc. as well.

The above embodiment illustrated the case of a wrap angle of the magnetic tape of 180°, but the wrap angle may be values other than 180° as well, for example, 270°.

Further, in the above embodiment, the explanation was made of the case of halving the rotational speed of the rotary drum 2 or the rotary drum 20, doubling the number of magnetic heads, and doubling the time-expansion of the video signal, but these values can be freely changed. For example, the rotational speed of the rotary drum 2 or 20 can be cut to one-third, the number of magnetic heads tripled, and the time-expansion tripled.

In the above description, reference was made to application of the invention to a combination video camera and recorder as a preferred embodiment, but the video signal recording and reproducing apparatus of the present invention is not limited to a combination video camera and recorder and can be applied to various other types of apparatuses for recording and reproducing a video signal as well.

In addition, illustration was made of a digital combination video camera and recorder in the above embodiment, but the apparatus for recording and reproducing a video signal of the present invention can similarly be applied to an analog VTR and effects similar to the above can be obtained.

As explained above, according to the present invention, the rotational drum of the rotary drum has been reduced to 1/k and the data rate at the time of recording is expanded by a factor of k on the time axis so as to reduce noise without substantially changing the diameter of the rotary drum and without changing the wrap angle of the magnetic tape.

Further, according to the present invention, the power consumption is reduced.

Still further, according to the present invention, the electric-magnetic conversion efficiency is improved.

Still further, according to the present invention, the noise at the time of reproduction can be reduced.

While specific embodiments of the invention have been shown and disclosed, it is to be understood that numerous changes and modifications may be made by those skilled in the art without departing from the scope and intent of the invention.

What is claimed is:

1. A method of recording a video signal wherein a magnetic tape is wound at an angle P on a standard rotary drum of a diameter D and M number of magnetic heads mounted at said standard rotary drum are made to rotate N number of times to record on said magnetic tape said video signal in a recording format substantially identical to a video signal recorded by a standard recording format, including the steps of:

making a diameter $D_R$ of a rotary drum a value substantially the same as said diameter D of said standard rotary drum;

providing k×M number (k is an integer of 2 or more) recording magnetic heads on said rotary drum;

winding said magnetic tape on said rotary drum by said angle P;

rotating said rotary drum at a rotational speed of 1/k the rotational speed of said standard rotary drum;

performing time expansion processing by a factor of k on said video signal to be recorded; and recording said time expanded video signal on said magnetic tape through said recording magnetic heads.

2. A method of recording and reproducing a video signal wherein a magnetic tape is wound at an angle P on a standard rotary drum of a diameter D and M number of magnetic heads mounted at the standard rotary drum are made to rotate N number of times to obtain on said magnetic tape said video signal in a recording format substantially identical to a video signal recorded by a standard recording format, including the steps of:

defining a diameter $D_R$ of a rotary drum a value substantially the same as said diameter D of said standard rotary drum;

providing k×M number (k is an integer of 2 or more) recording magnetic heads on said rotary drum;

providing k×M number of reproducing magnetic heads on said rotary drum;

winding said magnetic tape on said rotary drum by said angle P;

rotating said rotary drum at a rotational speed of 1/k the rotational speed of said standard rotary drum;

performing time expansion processing by a factor of k on said video signal to be recorded;

recording said time expanded video signal on said magnetic tape through said recording magnetic heads;

reading said video signal recorded on said magnetic tape through said reproducing magnetic heads; and     performing time compression by a factor of 1/k on said read video signal.

3. An apparatus for recording a video signal wherein a magnetic tape is wound at an angle P on a standard rotary drum of a diameter D and M number of magnetic heads mounted at said standard rotary drum are made to rotate N number of times to record on said magnetic tape said video signal in a recording format substantially identical to a video signal recorded by a standard recording format, comprising:

a rotary drum having a diameter $D_R$ of a value substantially the same as said diameter D of said standard rotary drum;

k×M number (k is an integer of 2 or more) recording magnetic heads provided at said rotary drum;

means for winding said magnetic tape on said rotary drum by said angle P;

means for rotating said rotary drum at a rotational speed of 1/k the rotational speed of said standard rotary drum;

means for performing time expansion processing by a factor of k on said video signal to be recorded; and     means for recording said time expanded video signal on said magnetic tape through said recording magnetic heads.

4. An apparatus for recording a video signal as set forth in claim 3, wherein said diameter of said rotary drum is corrected by a value so that the speed of said magnetic tape does not substantially affect the peripheral speed of said rotary drum.

5. An apparatus for recording a video signal as set forth in claim 4, wherein a lead angle of said rotary drum is corrected in accordance with air film.

6. An apparatus for recording a video signal as set forth in claim 4, wherein said recording magnetic heads are disposed together in two groups of half said magnetic heads each facing each other across a line passing through the center of said rotary drum,     and said plurality of recording magnetic heads disposed adjoining each other on each side of said rotary drum are disposed separated by exactly a predetermined angle.

7. An apparatus for recording and reproducing a video signal wherein a magnetic tape is wound at an angle P on a standard rotary drum of a diameter D and M number of magnetic heads mounted at said standard rotary drum are made to rotate N number of times to obtain on said magnetic tape the video signal in a recording format substantially identical to a video signal recorded by a standard recording format, comprising:

a rotary drum having a diameter $D_R$ of a value substantially the same as said diameter D of said standard rotary drum;

k×M number (k is an integer of 2 or more) recording magnetic heads provided on said rotary drum;

k×M number of reproducing magnetic heads provided on said rotary drum;

means for winding said magnetic tape on said rotary drum by said angle P;

means for rotating said rotary drum at a rotational speed of 1/k the rotational speed of said standard rotary drum;

means for performing time expansion processing by a factor of k on said video signal to be recorded;

means for recording said time expanded video signal on said magnetic tape through said recording magnetic heads;

means for reading said video signal recorded on said magnetic tape through said reproducing magnetic heads; and     means for performing time compression by a factor of 1/k on said read video signal.

8. An apparatus for reproducing a video signal as set forth in claim 7, wherein said reproducing magnetic heads are disposed in two groups facing each other across the center of said rotary drum at positions substantially orthogonal to said recording magnetic heads, and     said plurality of reproducing magnetic heads disposed adjoining each other on each side of said rotary drum are disposed separated by exactly a predetermined angle.

9. An apparatus for reproducing a video signal comprising:

a magnetic tape obtained by winding a magnetic tape at an angle P on a standard rotary drum of a diameter D and rotating M number of magnetic heads mounted at said standard rotary drum N number of times to record on the magnetic tape the video signal in a recording format substantially identical to a video signal recorded by a standard recording format by the means of providing, at a rotary drum having a diameter $D_R$ of a value substantially the same as said diameter D of said standard rotary drum, k×M number (k is an integer of 2 or more) recording magnetic heads, winding said magnetic tape on said rotary drum by said angle P, rotating said rotary drum at a rotational speed of 1/k the rotational speed of said standard rotary drum, performing time expansion processing by a factor of k on said video signal to be recorded, and recording said time expanded video signal on said magnetic tape through said recording magnetic heads;

k×M number of reproducing magnetic heads provided at the rotary drum;

means for reading said video signal recorded on said magnetic tape through said reproducing magnetic heads; and     means for performing time compression by a factor of 1/k on said read video signal.

* * * * *